(12) United States Patent
Adendorff et al.

(10) Patent No.: US 10,466,689 B2
(45) Date of Patent: Nov. 5, 2019

(54) MAINTENANCE OPTIMIZATION FOR ASSET PERFORMANCE MANAGEMENT

(71) Applicant: International Business Machines Corporation, Armonk, NY (US)

(72) Inventors: Michael Adendorff, Surrey (CA); Fabio Tiozzo, Vincennes (FR)

(73) Assignee: International Business Machines Corporation, Armonk, NY (US)

( * ) Notice: Subject to any disclaimer, the term of this patent is extended or adjusted under 35 U.S.C. 154(b) by 264 days.

(21) Appl. No.: 15/477,158

(22) Filed: Apr. 3, 2017

(65) Prior Publication Data

US 2017/0205818 A1 Jul. 20, 2017

Related U.S. Application Data

(63) Continuation of application No. 14/860,766, filed on Sep. 22, 2015.

(51) Int. Cl.
*G05B 23/02* (2006.01)
*G06N 7/00* (2006.01)
(Continued)

(52) U.S. Cl.
CPC ..... *G05B 23/0283* (2013.01); *G05B 23/0248* (2013.01); *G05B 23/0278* (2013.01);
(Continued)

(58) Field of Classification Search
CPC ............ G05B 23/0283; G05B 23/0248; G05B 23/0278; G05B 23/0281; G06F 11/0793; G06N 7/005
(Continued)

(56) References Cited

U.S. PATENT DOCUMENTS

| 6,453,353 B1 | 9/2002 | Win | |
|---|---|---|---|
| 6,853,930 B2 * | 2/2005 | Hayashi | G05F 1/66 702/61 |

(Continued)

OTHER PUBLICATIONS

Winsor_2007 (Repair/Replace Decision Making Practices, Energy Australia, ICOMS Asset Management Conference, Melbourne 2007 Paper 025 p. 10).*

(Continued)

*Primary Examiner* — Brian S Cook
(74) *Attorney, Agent, or Firm* — Erik K. Johnson

(57) ABSTRACT

A computer implemented method comprising receiving one or more predictive maintenance models each defining a time-based probability of failure for one or more components, receiving current performance data for the components, defining a failure function for each component from a predictive maintenance model for the component and the current performance data for the component, the failure function defining the probability of failure of the component in each of a set of time periods, defining a value loss function for each component from the failure function for the component and a time-based component cost, the value loss function defining the expected value loss due to a planned replacement of the component in a given time period before the component fails or reaches its scheduled end-of-life, receiving data defining one or more factors that have an impact on the cost of a maintenance option.

5 Claims, 4 Drawing Sheets

(51) Int. Cl.
*G06F 11/07* (2006.01)
*G06Q 10/06* (2012.01)
*G06Q 10/00* (2012.01)
*G07C 5/00* (2006.01)

(52) U.S. Cl.
CPC ...... *G05B 23/0281* (2013.01); *G06F 11/0793* (2013.01); *G06N 7/005* (2013.01); *G06Q 10/0635* (2013.01); *G06Q 10/20* (2013.01); *G07C 5/006* (2013.01); *Y02P 90/86* (2015.11)

(58) Field of Classification Search
USPC .......................................................... 703/7
See application file for complete search history.

(56) References Cited

U.S. PATENT DOCUMENTS

| | | | |
|---|---|---|---|
| 8,014,886 B2 | 9/2011 | Knapp | |
| 8,082,115 B2 * | 12/2011 | Bechhoefer | F03D 7/047 702/34 |
| 8,560,376 B2 | 10/2013 | Lienhardt | |
| 8,650,068 B2 | 2/2014 | Esser | |
| 2002/0138331 A1 | 9/2002 | Hosea | |
| 2006/0064393 A1 | 3/2006 | Orr | |
| 2012/0221193 A1 | 8/2012 | Delaye et al. | |
| 2013/0297370 A1 | 11/2013 | Pegden | |
| 2015/0105968 A1 | 4/2015 | Ho | |
| 2017/0083822 A1 | 3/2017 | Adendorff et al. | |

OTHER PUBLICATIONS

Moghaddam_2011 (Preventative Maintenance and Replacement Scheduling Models and Algorithms, Dept. of Industrial Eng, University of Louisville, Nov. 2008).*

Winsor_2007 (Repair/Replace Decision Making Practices, Energy Australia, ICOMS Asset Management Conference, Melbourne 2007 Paper 025 p. 10) (Year: 2007).*

Moghaddam_2011 (Preventative Maintenance and Replacement Scheduling Models and Algorithms, Dept. of Industrial Eng, University of Louisville, Nov. 2008). (Year: 2008).*

Winsor et al., "Repair / Replace Decision Making Practices", ICOMS Asset Management Conference, Melourne 2007 Paper 025, 10 pages.

Moghaddam, Kamran, S., "Preventive Maintenance and Replacement Scheduling: Models and Algorithms", Nov. 2008, 93 pages.

IBM: List of IBM Patents or Patent Applications Treated As Related (Appendix P), Apr. 3, 2017, pp. 1-2.

Adendorff et al., Pending U.S. Appl. No. 15/477,158, filed Apr. 3, 2017, titled "Maintenance Optimization for Asset Performance Management,", pp. 1-23.

Almgren et al., "Optimization models for improving periodic maintenance schedules by utilizing opportunities," Proceedings of 4th Production and Operations Management World Conference, Jul. 2012, p. 1-10, Chalmers University of Technology.

Khaira et al., "An Optimized Decision for Opportunistic Maintenance or Event-Driven Maintenance of Industrial System," International Journal of Scientific & Engineering Research, Jun. 2012, p. 1-5, vol. 3, Issue 6.

Maggioni et al., "Analyzing the quality of the expected value solution in stochastic programming," Annals of Operations Research, Nov. 2012, p. 1-21, vol. 200, Issue 1, Springer Science + Business Media.

Sarkar et al., "Survey of maintenance policies for the Last 50 Years," International Journal of Software Engineering & Applications (IJSEA), Jul. 2011, p. 130-148, vol. 2, No. 3.

Varnier_2012 (Scheduling predictive maintenance in flow-shop, IEEE conference on prognostics and systems, May 2012).

Zhu_2015 (Maintenance optimization for multi-component systems under condition monitoring, Jan. 1, 2015 TU/e Eindhoven University of Technology).

* cited by examiner

| Machine 1 | | 1 | 2 | 3 | 4 | 5 | 6 | 7 | 8 | 9 | 10 |
|---|---|---|---|---|---|---|---|---|---|---|---|
| Component 1 | week | | | | | | | | | | |
| | pfail | 0.00039063 | 0.00625 | 0.025 | 0.1 | 0.6 | 0.3 | 0.025 | 0.00625 | 0.0015625 | 0.00039063 |
| | Planned maintenance | | | | | | | | | 1 | |
| | Cost of early replacement | | | | | | | | | 12640.63 | |
| Component 2 | pfail | 0.00078125 | 0.0015625 | 0.003125 | 0.00625 | 0.0125 | 0.025 | 0.05 | 0.05 | 0.05 | 0.0125 |
| | Planned maintenance | | | | | | | 1 | | | |
| | Cost of early replacement | | | | | | | 302.34 | | | |
| | Planned maintenance downtime | | | | | | | 7.00 | | 7.00 | |
| | Expected unplanned downtime | 0.02 | 0.11 | 0.39 | 1.49 | 7.58 | 1.75 | 0.04 | 0.03 | 0.00 | 0.00 |
| | Total expected downtime | 0.02 | 0.11 | 0.39 | 1.49 | 7.58 | 1.75 | 7.04 | 0.03 | 7.00 | 0.00 |

FIG. 3

MAINTENANCE OPTIMIZATION FOR ASSET PERFORMANCE MANAGEMENT

BACKGROUND

The present invention relates to a method and system for creating an optimization model for components that need to be maintained.

SUMMARY

According to a first aspect of the present invention, there is provided a computer implemented method comprising, receiving one or more predictive maintenance models each defining a time-based probability of failure for one or more components, receiving current performance data for the components, defining a failure function for each component from a predictive maintenance model for the component and the current performance data for the component, the failure function defining the probability of failure of the component in each of a set of time periods, defining a value loss function for each component from the failure function for the component and a time-based component cost, the value loss function defining the expected value loss due to a planned replacement of the component in a given time period before the component fails or reaches its scheduled end-of-life, receiving data defining one or more factors that have an impact on the cost of a maintenance option, creating an optimization model for all components from the component failure functions, the value loss functions and the data defining one or more factors that have an impact on the cost of a maintenance option, the solutions to the optimization model representing the per time period effect of one or more maintenance options.

According to a second aspect of the present invention, there is provided a system comprising a processor to receive one or more predictive maintenance models each defining a time-based probability of failure for one or more components, receive current performance data for the components, define a failure function for each component from a predictive maintenance model for the component and the current performance data for the component, the failure function defining the probability of failure of the component in each of a set of time periods, define a value loss function for each component from the failure function for the component and a time-based component cost, the value loss function defining the expected value loss due to a planned replacement of the component in a given time period before the component fails or reaches its scheduled end-of-life, receive data defining one or more factors that have an impact on the cost of a maintenance option, create an optimization model for all components from the component failure functions, the value loss functions and the data defining one or more factors that have an impact on the cost of a maintenance option, the solutions to the optimization model representing the per time period effect of one or more maintenance options.

According to a third aspect of the present invention, there is provided a computer program product for controlling a system, the computer program product comprising a computer readable storage medium having program instructions embodied therewith, the program instructions executable by a processor to cause the processor to receive one or more predictive maintenance models each defining a time-based probability of failure for one or more components, receive current performance data for the components, define a failure function for each component from a predictive maintenance model for the component and the current performance data for the component, the failure function defining the probability of failure of the component in each of a set of time periods, define a value loss function for each component from the failure function for the component and a time-based component cost, the value loss function defining the expected value loss due to a planned replacement of the component in a given time period before the component fails or reaches its scheduled end-of-life, receive data defining one or more factors that have an impact on the cost of a maintenance option, create an optimization model for all components from the component failure functions, the value loss functions and the data defining one or more factors that have an impact on the cost of a maintenance option, the solutions to the optimization model representing the per time period effect of one or more maintenance options.

BRIEF DESCRIPTION OF THE SEVERAL VIEWS OF THE DRAWINGS

Preferred embodiments of the present invention will now be described, by way of example only, with reference to the following drawings, wherein:

FIG. 3 is a data flow diagram of a process of generating an optimization model.

DETAILED DESCRIPTION

Figure 1:
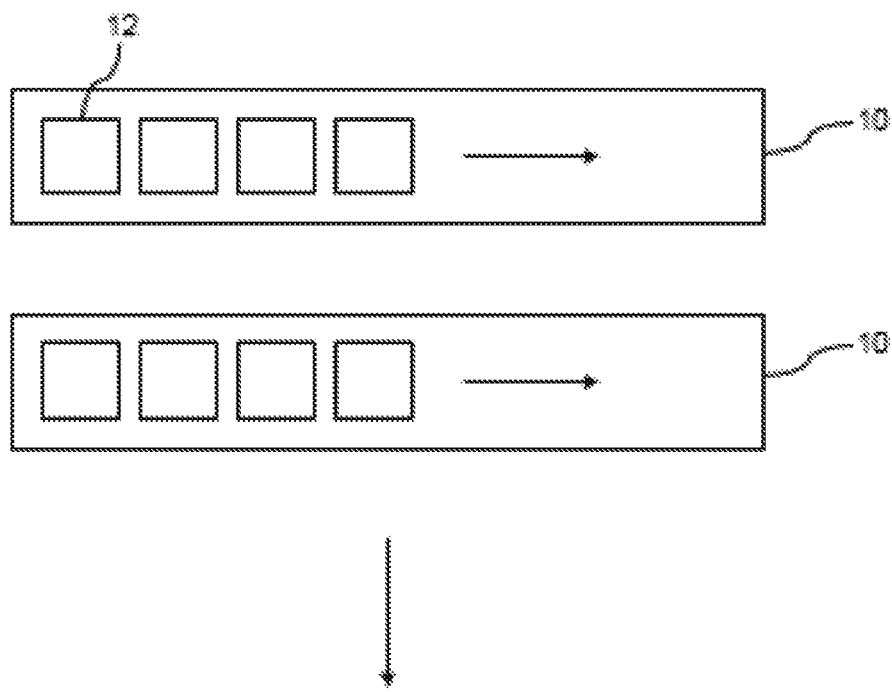
FIG. 1 is a schematic diagram of a series of machine and components.

FIG. 1 shows a series of machines 10 that are each made up of a number of discrete components 12. The definition of what constitutes a machine 10 and a component 12 is arbitrary, so for example each machine 10 could be a vehicle in a fleet of vehicles and each component could be discrete components within each vehicle. Alternatively, each machine 10 could be an individual element within a vehicle, such as a gearbox, a brake system and so on, with the components corresponding to lower level components within the individual gearbox and brake system and so on. Equally, the machines 10 could be machines within a production facility such as car manufacturing plant, with the components considered as individual components located within each machine.

Maintenance is needed on components 12, either to repair them when they have failed or to replace and/or service them, in anticipation of a future failure. In very large production environments, the number of machines and hence the number of components can be very large and the cost of maintenance can be a very significant part of the resource budget. Cost can be considered to include multiple factors, not just the pure financial cost of parts and labor, there can be a production cost of maintenance (lost production while machines are repaired), a time cost (time taken to repair/replace a working component versus time taken to repair/replace a failed component), a space cost (the physical area required to perform maintenance) and so on. All of these factors have to be considered when considering when and how machines and their components should be maintained.

A big challenge in preventive maintenance is to minimize the risk of equipment downtime associated with unexpected failures, while avoiding unnecessary or premature maintenance. There is a need to develop an effective and efficient method and system to support a maintenance planner (who will determine maintenance scheduling) in choosing the right time to perform maintenance on the machines and their components, with the goal of minimizing the total cost, which can include, for example, the total maintenance costs plus the cost of production losses due to equipment downtime. As uncertainty in equipment failure often plays a fundamental role in the total actual cost, while evaluating the right timing of maintenance activities, the solution has to take into account the risk and the impact of unexpected equipment failures. Moreover, the solution has to take into account the fact that, while anticipating a component replacement activity earlier than needed will reduce the equipment failure risk, the components cost due to unnecessary or premature replacement will increase.

Mathematical optimization can be used for maintenance planning. Optimization is frequently used to solve planning problems by aligning maintenance plans with production plans, minimizing travel time for maintenance staff and ensuring high utilization of maintenance crews. However, results obtained from these models are sub-optimal as they fail to consider properly the risks associated with the timing of maintenance and the costs due to premature maintenance. Although these models present the maintenance planner with maintenance plans that show a high utilization of maintenance resources and a low impact of planned maintenance on production, in reality due to the unexpected equipment failures, the actual maintenance costs and the actual impact of downtimes on production are often far higher than the presented values indicated by the model that the maintenance planner is using.

Predictive maintenance employs mathematics, statistics and machine learning techniques to estimate expected failure dates so that maintenance can be scheduled shortly before failure. These models seek to reduce unexpected failures and reduce maintenance costs by avoiding premature maintenance. The success of pure predictive maintenance is undermined by the fact that such an arrangement may result in higher maintenance costs than traditional time-based maintenance as maintenance in complex multi-component equipment is recommended independently for each component. Pure predictive maintenance recommendations do not take into account the opportunities to combine (when possible) several component maintenance activities in just one equipment downtime to reduce the total downtime by factoring common module dismounting/mounting needed to operate on the components. Predictive maintenance may also result in maintenance plans that are not feasible to carry out, for example due to insufficient maintenance resources or due to the impact on the production schedule.

Stochastic simulation models can also be built to overcome the shortcoming of optimization in maintenance planning and predictive maintenance. These simulation models simultaneously take into account the uncertainty associated with failure, the production schedule and available resources. Maintenance schedules derived through simulation have the potential to result in low maintenance costs and low production loss due to equipment failure. However the simulations tend to be too costly to build and maintain, so much so that the cost of building and maintaining can easily exceed the savings derived through an effective strategy. Finally, their lengthy response times may prevent these models from running in a reactive mode, where it is necessary to re-plan when an unplanned failure occurs.

Stochastics programming can be used but given the complexity of the problem, some further relevant assumptions and simplifications would be necessary so that the quality of the final solution may be acceptable. Moreover, quick response times, and models that are easy to maintain and extend to cover specific client requirements are key to the requirements that a solution based on stochastic programming cannot easily guarantee. Stochastic programs are usually harder to solve when applied to real-world problems. A common approach is to consider the simpler deterministic program in which random parameters are replaced by their expected values, with a loss in terms of quality of the solution. The problem with this approach is that often the solutions that are generated are average solutions that cannot be executable.

The machines 10 and components 12 of FIG. 1 have their maintenance scheduled in a solution that achieves the benefits of low production impact and high utilization of resources associated with optimized maintenance planning while also considering failure risk and its influence on timing to reduce the impact of unplanned downtime on production and keep costs associated with premature maintenance in check. The solution involves models that take significantly less time to build and maintain and are less computationally expensive than stochastic simulation models. The solution provides a way to transform a stochastic problem into a deterministic one that produces feasible (executable) and reasonably good solutions to the problem of the scheduling maintenance for the machines 10.

Figure 2:
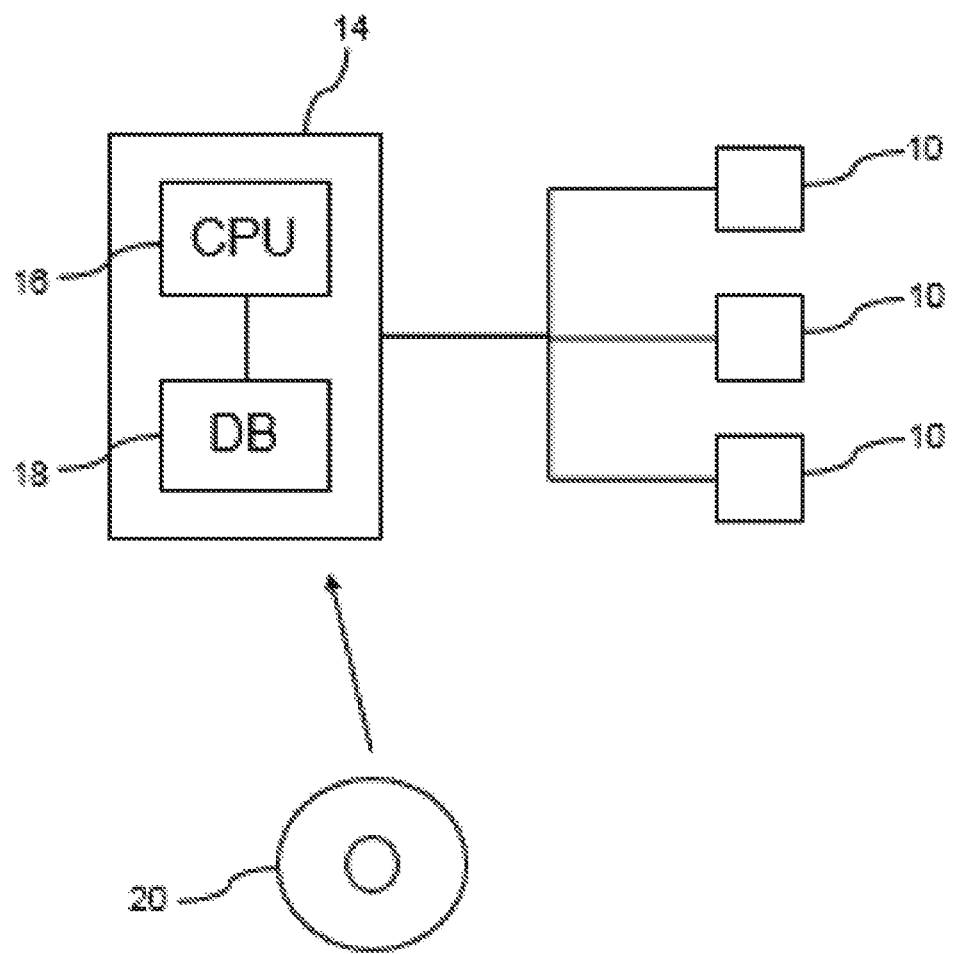
FIG. 2 is a schematic diagram of a system connected to the machines.

FIG. 2 shows a system 14 that is connected to the machines 10. The system 14 includes a processor (e.g. CPU) 16 and a storage device (e.g., database) 18 that is connected to the processor 16. A computer readable medium 20 is also provided that comprises a computer program product. The computer program product comprises a set of instructions that are used to control the operation of the processor 16. The system 14 receives information from the various machines 10 that relates to the current operating conditions of the machines 10 and their components 12. The system 14 is designed to provide an output that will be accessed by a maintenance planner so that the planner will make the necessary decisions relating to maintenance.

The system 14 uses stochastic failure predictions to optimize maintenance activities using a deterministic model. The system 14 uses the stochastic failure predictions of a predictive maintenance system to create a deterministic optimization model (in a preferred embodiment the processor 16 uses a Mixed Integer Linear Programming model) that, in the evaluation of a candidate solution and in addition to the business goals, takes into account both the risk and the impact of an earlier unexpected component failures and the expected component value loss due to component replacement at the planned time. The processor 16 creates an optimization model for all of the components 12 which provides solution(s) that represent one or more maintenance options.

This process used by the system 14 results in models that are easy to build and maintain while mitigating the disadvantages associated with using predictive maintenance on its own to derive a maintenance schedule or using predictive maintenance as a deterministic input to a maintenance optimization model (usually modelled as due dates or deadlines for the maintenance activities). Moreover, with respect to other more complex approaches, the process used by the system 14 has the advantages that the process is scalable and a maintenance planner will easily understand the solutions delivered by the optimization model. The model provides one or more maintenance options depending upon the business decisions driving the choice of maintenance plan. For example, the lowest planned cost option may be sought or a balance between the risk and the expected cost of failures on one side and the planned maintenance/production on the other side may be sought. The system, in a preferred embodiment, provides the maintenance planner with alternative plans (options) and the planner at the end selects one option. The process is interactive in that the planner will interact with an initial option provided by the system 14, for example making manual adjustments to a plan, releasing constraints or imposing new constraints, modifying the availability of resources and modifying the importance given to goals. The planner will then re-run the optimization to check again the results and if needed making new modifications and re-running the optimization again. The system 14 provides an iterative process that will end when the planner is happy with the plan and confirms the plan for the execution.

The modelling carried out by the system 14 is related to risk and the impact of unexpected component failures and the expected component value loss due to component replacement. The processor 16 divides the time horizon into time buckets that define a set of time periods, measured in hours, days or week as appropriate to the machines and components being considered. The decision variables of the problem define, for each machine 10 and for each component 12, in which time bucket the next component maintenance should take place, in light of the objectives of the maintenance plan. The model takes into account that several preparation and assembly and disassembly activities will be optimized if the maintenance activity of certain components is planned in the same time bucket.

The system 14 models the risk and the impact of unexpected component failures. For each machine 10 and for each component 12, predictive models are used to estimate a probability mass function Pcfail of the random variable that a component fails at time t. In the following, a value will be defined as expected when the value will take into account the probability of the related events. For each machine 10, for each component 12, and for each time bucket the processor 16 starts from the Pcfail and the average component repairing/replacement duration and resource requirements and calculates the expected time and resources needed to repair/replace the component 12. This defines a function for each component 12 from a predictive maintenance model and the current performance data for each component 12, which defines the likelihood of failure of the component 12 in question as a probability mass function. The current performance data preferably also includes information about the operating conditions of the component 12 and the machine 10 containing the component 12 which are transmitted by sensors connected to the component 12 and to related parts in the machine 10.

For each machine 10 and for each time bucket, the system 14 calculates the probability mass function Pmfail that a machine downtime occurs due to unexpected component failures. In a simple case this is just the sum of the failure probability of the components. The total expected pure repair/replace time and resources needed by the downtime are the sum of all the respective values calculated at component level. At these values, if the system 14 is to be conservative in the calculations, the processor 16 adds all the expected preparation, disassembly and assembly times and resources needed by each component 12. If the system 14 is to be less conservative and assumes that the preparation, disassembly and assembly will be optimized, then the processor 16 adds the optimized preparation, disassembly and assembly time (this value will depend on the specific components 12 and related preparation, disassembly and assembly rules) multiplied by Pmfail.

Finally, to calculate the total expected downtime and resource requirements the processor 16 will add the expected time and resources necessary to model the extra time needed to manage the occurrence of an unexpected event. For each machine 10, with the above information, the processor 16 calculates the expected impact on the maintenance resources and on the production level due to an unplanned downtime for all the time buckets that precede the planned maintenance downtime. The total expected impact on the maintenance resources and on the production level due to unplanned downtimes is finally an important weighted component of the global objective function to be optimized together the impact on the maintenance resources and on the production level due to planned downtimes.

The system 14 also models the costs that would be incurred due to an early component replacement. In order to do that, the processor 16, starting from the cost of each component 12 at each bucket after an amortization calculation and the component Pcfail, calculates, for each component and each bucket, the expected loss of component value due if the component would be replaced in that bucket (time window). The total expected loss of component value due to the planned component replacements will finally enter in the global objective function to be optimized as an important weighted component.

In order to provide the maintenance planner with the possibility to take into account the expected impact of the uncertainties while evaluating a maintenance plan, a key element of the process is to have an easy and intuitive way to display the risk/impact associated to the plan. Workload resource histograms, graphics showing the impacts on production and on the maintenance resources, and many other graphic tools can be used to make visible at the same time, by clearly differentiating them (for example with different colors), both the impact of the plan and the risks associated. The solution finally provides alerts to highlight to the planner the impact of too risky situations. The maintenance planner accesses a graphical user interface to the optimization model, which shows the planner the effect of different maintenance options on the delivery and cost of maintenance.

The process carried out by the system 14 transforms the stochastic output of predictive maintenance into a series of inputs for a deterministic model to take into account the uncertainty of the key elements of the problem. This allows the solving of a stochastic problem using a deterministic optimization model that is easy to build and maintain and is computationally inexpensive compared with a stochastic simulation model. The process groups maintenance tasks on multi-component equipment together to reduce the total set-up cost. Several set-up optimization rules can apply. The system 14 provides an easy and intuitive way to evaluate the risk of a given maintenance plan. This is useful both to evaluate an automatic solution provided by the optimizer and to evaluate a manually generated solution (by scratch or by modifying interactively an automatic one).

FIG. 3 shows schematically the different elements of the processing as carried out by the processor 16 of the system 14. The system 14 has various different inputs and outputs and these are shown in the high level data flow diagram of FIG. 3. One or more predictive maintenance models 22 are provided along with current (real time) performance data 24 for the components 12. The predictive maintenance models 22 define a time-based probability of failure for one or more of the components 12 and are created by using historical data about component performance and failures. Equipment failure predictions 26 are made, the output of which is the component failure functions and expected value loss functions due to planned replacements. The time-based cost of components 12 (after amortization) is also provided as an input to box 26, as this is used in the calculation of the expected value loss functions.

A failure function for each component 12 is defined from a predictive maintenance model 22 for the component 12 and the current performance data 24 for the component 12, where the failure function defining the probability of failure of the component 12 in each of a set of time periods. An expected value loss function for each component 12 is defined from the failure function for the component 12 and the component time-phased cost after amortization for the component 12, the expected value loss function defining the expected value loss of component 12 in each of the set of time periods assuming the replacement will be planned in that bucket (time period). The value loss function for each component is created from the failure function for the component and a time-based component cost, the value loss function defining the expected value loss due to a planned replacement of the component in a given time period before the component fails or reaches its scheduled end-of-life when the component would be replaced. This provides the core structure for the data to be processed in the optimization to provide the solutions to the optimization model representing the per time period effect of one or more maintenance options.

These computations are passed to a MILP optimization solver 28, which also receives as its input data 30 defining (as a minimum) component costs and maintenance costs. These costs are data defining one or more factors that have an impact on the cost of a maintenance option. These costs, in a preferred embodiment, are configured in terms of a pure financial costs and/or time costs. Additional input data can relate to factors such as average durations, resources requirements and their availability calendars, skills, mounting/dimounting rules and so on. The factors can be component time-phased availability, durations of the maintenance activities on a component and of a mounting/di-mounting phases, rules to optimize the mounting/di-mounting, resource requirements of any activity, resources time-phased availability, standard resource cost and cost for extra capacity, time and cost to react to a machine failure to be counted on top of the normal times/costs for performing a preventive maintenance, production or service demand plan with the relative cost of partial fulfilment due to failure or maintenance and so on.

The solver 28 will create one or more optimization model solutions of which represent the per time period effect of one or more maintenance options. The solver 28 is accessible via a user interface 32 which presents the proposed plan(s) to the maintenance planner who can also input parameters and choices to influence the decision making. The role of the system 14 is to provide an optimization model of the maintenance that can be used to decide which maintenance option to use, through the use of an optimization engine, which will depend on the factors that are considered to be most important, such as overall cost or safety margin in respect to failure of components and so on. The process does not optimize each factor independently as generally factors are conflicting. The system 14 optimizes a global goal that has been defined as composed of several factors with their respective weights.

Figure 4:
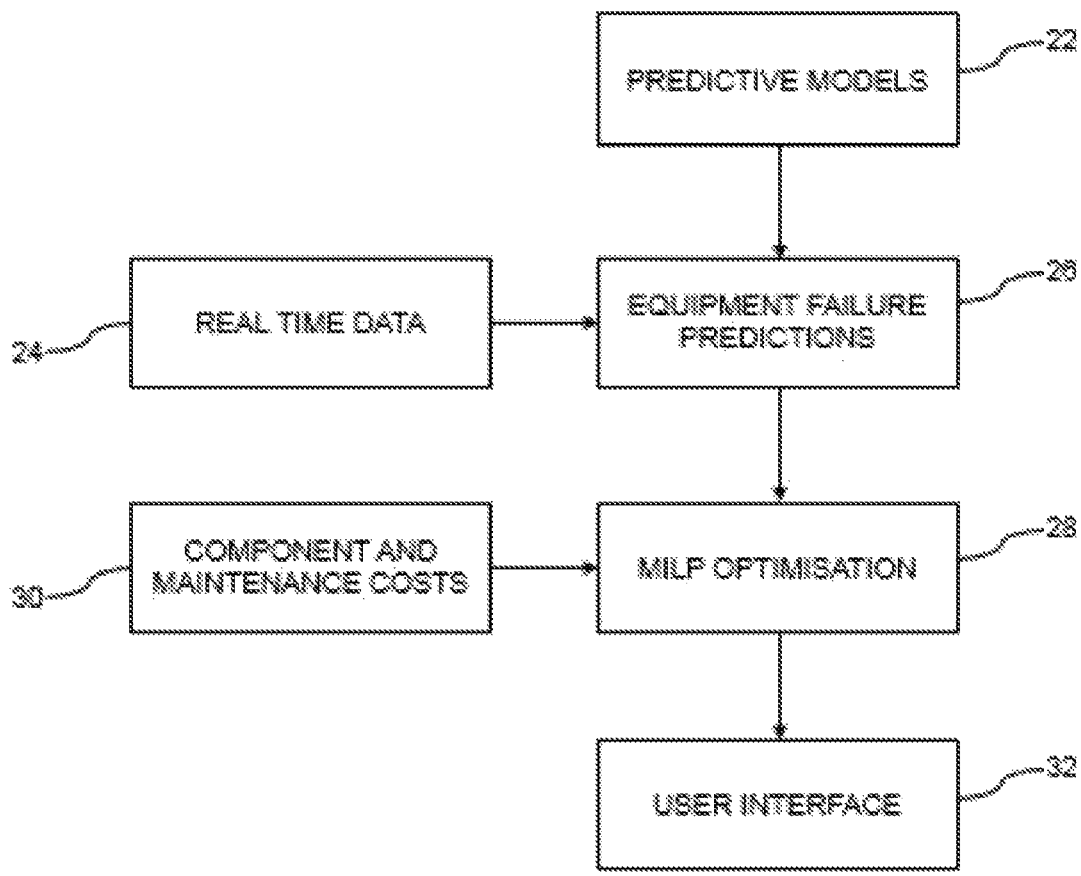
FIG. 4 is schematic diagram of a graphical user interface to a maintenance option which is a solution for an optimization model.

FIG. 4 shows the appearance of the graphical user interface 32, in a preferred embodiment, as generated by the processor 16. The graphical user interface 32 provides an illustration of a preferred maintenance option as a matrix of components against time periods and the impact on maintenance resources and production of both planned and unplanned maintenance. In FIG. 3, the columns in the table represent the different time periods for which maintenance can be carried out. Here the time periods are weeks, showing weeks 1 to 10 for a machine 10 that has two components 12 (listed as Component1 and Component2). This is a simplified example, for the purpose of illustrating the outputting of a solution generated by the optimization model.

In this Figure a single maintenance option is illustrated, with the first component being scheduled for maintenance in week 9 and the second component being scheduled for week 7. The function pfail is shown for each of the components 12, this is derived from the predictive maintenance model(s) for the components 12 applied to the current real-time data about the present operation conditions and performance of the components 12. The pfail is a probability mass function which shows in which week the individual component is most likely to fail, with the probabilities falling away either side of the most likely time period. The expected cost for early replacement is also shown for each of the components 12, this impacts the decision as whether to perform maintenance early or not.

The planned maintenance downtime is shown in the table along with the expected unplanned downtime and the total expected downtime. These values are a function of the decision about when maintenance is planned and also for time periods where none is planned the probability of a failure in that week is multiplied by the time cost of an unplanned maintenance, which will generally be greater than the time cost of a planned maintenance. The different totals are visible for the different time periods used in the table of FIG. 4 and cells within the table are colored based on the numbers within in each cell, in order that critical aspects are easily highlighted to the planner. These reflect the global sum of the likely outcomes for the different components 12 that make up the total components being covered by the optimization model.

The maintenance option that is shown in FIG. 4 is clearly visualized for the benefit of the maintenance planner. The planner can see that maintenance of the second component is scheduled for week 7, one week before the most likely week for that component to fail. However, the maintenance of component 1 is scheduled for week 9, which is fully four weeks after the most likely week for the component to fail (week 5). Although the risk of early failure occurs, this is offset by the total cost of the replacing the component early and in balance later maintenance is preferred. The reason behind the late scheduling of the maintenance of the specific component relates to the early replacement cost and may also depend from the interactions with other maintenance activities (the total resource requirements might have exceeded the standard capacity of available resources and the system decided that the best decision was to delay that maintenance activity of that component).

Data defining a maximum maintenance capacity per time period for all components can be used in the creation of the optimization model. For all components, the processor 16 defines maintenance options that do not exceed the maximum maintenance capacity per time period for all components. This ensures that the maintenance option presented to the planner is feasible with respect to the resources available and takes into account all of the components 12 that are covered by the model. Since in practice very large numbers of components 12 will be covered by the maintenance options, resource availability is a significant limiting factor in the selection of the desired maintenance option and the processor 16 must present a workable scheme to the planner. Capacity can relate to any resource that is needed to perform the maintenance activities, from skilled workers, to maintenance material, spare parts, equipment, space and so on.

The processor 16 can receive an input from the planner defining a set of desired optimization outcomes, each defined optimization outcome defining one or more factors to be optimized. For example, cost may be the driving factor and the planner can input this into the model as a preferred outcome, that the maintenance option presented will be the lowest cost option available within the constraints of available resources. Equally, the planner may be driving the maintenance schedule to limit disruption on specific time periods, if they relate to important production capability. In this case the maximum amount of reduced production capacity can be set as a factor that can drive the optimization outcome. The planner can even set a level of importance (usually in the form of a 'weight' or a priority) to each factor to be optimized and the processor 16 can propose maintenance plan options that optimize those factors taking into account the importance the planner gave to each factor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
a processor capable of performing a method comprising:
receiving one or more predictive maintenance models each defining a time-based probability of failure for one or more components,
receiving current performance data for the components,
defining a failure function for each component from a predictive maintenance model for the component and the current performance data for the component, the failure function defining the probability of failure of the component in each of a set of time periods,
defining a value loss function for each component from the failure function for the component and a time-based component cost, the value loss function defining the expected value loss due to a planned replacement of the component in a given time period before the component fails or reaches its scheduled end-of-life,
receiving data defining one or more factors that have an impact on the cost of a maintenance option,
defining one or more time buckets, wherein the one or more time buckets define a time period in which maintenance takes place for the one or more components, and wherein maintenance plans for the one or more components are optimized in response to the maintenance for two or more components being planned in a same time bucket associated with the one or more time buckets,
for each of the one or more time buckets, determining a machine downtime due to an unexpected failure of the one or more components, and determining an expected impact on production and on maintenance resources due to the machine downtime,
creating an optimization model for all components from the component failure functions, the value loss functions and the data defining one or more factors that have an impact on the cost of a maintenance option, the solutions to the optimization model representing the per time period effect of one or more maintenance options.

2. The computer-implemented method according to claim 1, further comprising:
receiving data defining a maximum maintenance capacity per time period for all components and when creating the optimization model for all components to define maintenance options that do not exceed the maximum maintenance capacity per time period for all components.

3. The computer-implemented method according to claim 1, further comprising:
receiving an input defining a set of desired optimization outcomes, each defined optimization outcome defining one or more factors to be optimized and wherein creating the optimization model for all components defines maintenance options that each provide optimization of each factor defined in a desired optimization outcome.

4. The computer-implemented method according to claim 1, further comprising:
determining a preferred maintenance option with respect to a desired optimization outcome and output an illustration of the preferred maintenance option as a matrix of components against time periods plus the impact of the failure function for each component as a component cost.

5. The computer-implemented method according to claim 4, further comprising:
outputting a selection of maintenance options and receive an input defining a preferred maintenance option.

* * * * *